United States Patent
Lu et al.

(10) Patent No.: US 11,164,707 B2
(45) Date of Patent: Nov. 2, 2021

(54) TOUCH DEVICE AND INPUT MODULE

(71) Applicants: LITE-ON ELECTRONICS (GUANGZHOU) LIMITED, Guangzhou (CN); Lite-On Technology Corporation, Taipei (TW)

(72) Inventors: Cheng-An Lu, Taipei (TW); Kuo-Hua Kao, Taipei (TW); Yu-Cang Chen, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/835,237

(22) Filed: Mar. 30, 2020

(65) Prior Publication Data

US 2020/0333917 A1    Oct. 22, 2020

Related U.S. Application Data

(60) Provisional application No. 62/834,408, filed on Apr. 16, 2019.

(30) Foreign Application Priority Data

Dec. 5, 2019  (CN) .......................... 201911230939.6

(51) Int. Cl.
*H01H 13/83*    (2006.01)
*F21V 8/00*     (2006.01)
(Continued)

(52) U.S. Cl.
CPC .......... *H01H 13/83* (2013.01); *G02B 6/0055* (2013.01); *G06F 1/169* (2013.01); *G06F 3/0445* (2019.05);
(Continued)

(58) Field of Classification Search
CPC combination set(s) only.
See application file for complete search history.

(56) References Cited

U.S. PATENT DOCUMENTS

| 2005/0052425 A1* | 3/2005 | Zadesky | ................. G06F 3/041 345/173 |
| 2007/0139388 A1* | 6/2007 | Lee | .......................... G06F 3/041 345/173 |

(Continued)

*Primary Examiner* — William Boddie
*Assistant Examiner* — Alecia D English
(74) *Attorney, Agent, or Firm* — JCIPRNET (57) ABSTRACT

The invention provides a touch device and an input module. The touch device includes a cover plate, a circuit board, a restoration element, a bracket, at least one conductive pad, and a buffer layer. The circuit board is disposed on one side of the cover plate and has a first surface facing the cover plate, a second surface opposite to the first surface, and at least one conductive switch disposed on the second surface. The bracket is disposed on the second surface of the circuit board. The restoration element is disposed on the second surface, and the conductive pad is disposed on the bracket and located between the bracket and the circuit board. The conductive pad and the restoration element are separately disposed, and the conductive pad corresponds to the conductive switch. The buffer layer is disposed between the second surface and the restoration element.

17 Claims, 5 Drawing Sheets

(51) Int. Cl.
  *G06F 3/044* (2006.01)
  *G06F 1/16* (2006.01)
(52) U.S. Cl.
  CPC ... *H01H 2219/06* (2013.01); *H01H 2219/062* (2013.01)

(56) References Cited

U.S. PATENT DOCUMENTS

| | | | |
|---|---|---|---|
| 2012/0229396 A1* | 9/2012 | Tsai | G06F 3/03547 345/173 |
| 2013/0234938 A1* | 9/2013 | Xue | G06F 1/169 345/158 |
| 2014/0111914 A1* | 4/2014 | Leggett | H01H 9/02 361/679.1 |
| 2014/0218301 A1* | 8/2014 | Tsai | G06F 3/038 345/168 |
| 2020/0183510 A1* | 6/2020 | Chen | G06F 1/169 |

* cited by examiner

TOUCH DEVICE AND INPUT MODULE

CROSS-REFERENCE TO RELATED APPLICATION

This application claims the priority benefits of U.S. provisional application Ser. No. 62/834,408, filed on Apr. 16, 2019, and China application serial no. 201911230939.6, filed on Dec. 5, 2019. The entirety of each of the above-mentioned patent applications is hereby incorporated by reference herein and made a part of this specification.

BACKGROUND OF THE INVENTION

1. Field of the Invention

The invention relates to a touch device and an input module. More particularly, the invention relates to a touch device capable of providing reduced noise and an input module using the touch device.

2. Description of Related Art

In a notebook computer, for example, when the position of the mouse cursor on the display screen is required to be controlled, the integrated touch device may be used to perform the cursor movement or clicking control similar to the function of the mouse. Nevertheless, every time when a user presses the touchpad of the touch device, the metal restoration element under the touchpad produces click noise. The user may thus experience a less favorable user experience. If a softer or less rigid material is selected to serve as the restoration element, the noise produced by the restoration element may be reduced. Nevertheless, the click ratio may be excessively low, and that the user may not enjoy satisfactory tactile feedback. Further, only a limited noise reduction effect is provided.

SUMMARY OF THE INVENTION

The invention provides a touch device capable of providing reduced noise generated during pressing the device and delivering favorable tactile feedback of pressing.

The invention further provides an input module including the touch device and providing not only favorable tactile feedback of pressing but also a noise reduction effect, so that a favorable user experience is provided.

A touch device of the invention includes a cover plate, a circuit board, a restoration element, a bracket, at least one conductive pad, and a buffer layer. The circuit board is disposed on one side of the cover plate and has a first surface facing the cover plate, a second surface opposite to the first surface, and at least one conductive switch disposed on the second surface. The bracket is disposed on the second surface of the circuit board. The restoration element is disposed on the second surface of the circuit board, and the conductive pad is disposed on the bracket and located between the bracket and the circuit board. The conductive pad and the restoration element are separately disposed, and the conductive pad corresponds to the conductive switch. The buffer layer is disposed between the second surface of the circuit board and the restoration element.

In an embodiment of the invention, the touch device further includes a support disposed between the bracket and the second surface of the circuit board. The bracket has a first side and a second side opposite to each other. The conductive switch and the restoration element are disposed corresponding to the first side of the bracket, and the support is pivotally connected to the second side of the bracket.

In an embodiment of the invention, the touch device further includes a first bonding layer and a second bonding layer. The first bonding layer is disposed on one side of the support. The support is fixed onto the bracket through the first bonding layer. The second bonding layer is disposed on the other side of the support. The support is fixed onto the circuit board through the second bonding layer.

In an embodiment of the invention, an orthographic projection of the restoration element onto the circuit board does not overlap the conductive switch.

In an embodiment of the invention, an orthographic projection of the restoration element onto the circuit board overlaps the conductive switch, and the restoration element is electrically insulated from the conductive switch through the buffer layer.

In an embodiment of the invention, a material of the buffer layer includes rubber, insulating foam, polyurethane (PU) or polyethylene terephthalate (PET). A sum of thicknesses of the buffer layer and the restoration element is greater than a thickness of the conductive pad.

In an embodiment of the invention, the conductive pad includes conductive foam, carbon granules, or an anisotropic conductive adhesive. The conductive switch is a circuit pattern disposed on a surface of the circuit board. When the touch device is not pressed, a gap is provided between the conductive pad and the corresponding conductive switch.

In an embodiment of the invention, an orthographic projection of the conductive pad onto the circuit board overlaps the corresponding conductive switch.

In an embodiment of the invention, an area of an orthographic projection of the buffer layer onto the circuit board is greater than or equal to an area of an orthographic projection of the restoration element onto the circuit board.

In an embodiment of the invention, the conductive switch includes two conductive switches, and the restoration element is located between the two conductive switches.

An input module of the invention includes a casing, a keyboard assembly, and a touch device. The casing has an operating surface and an accommodating opening penetrating the casing. The keyboard assembly is disposed on the operating surface of the casing. The touch device is disposed in the accommodating opening of the casing. The touch device includes a cover plate, a circuit board, a restoration element, a bracket, at least one conductive pad, and a buffer layer. The cover plate is exposed on the operating surface. The circuit board is disposed on one side of the cover plate and has a first surface facing the cover plate, a second surface opposite to the first surface, and at least one conductive switch disposed on the second surface. The bracket is disposed on the second surface of the circuit board. The bracket has a first side and a second side opposite to each other, and the circuit board is connected to the second side of the bracket. The restoration element is disposed on the second surface of the circuit board, and the conductive pad is disposed on the bracket and is located between the bracket and the circuit board. The conductive pad and the restoration element are separately disposed on the first side of the bracket, and the conductive pad corresponds to the conductive switch. The buffer layer is disposed between the second surface of the circuit board and the restoration element.

Based on the above, in the touch device of the embodiments of the invention, the buffer layer is disposed between the circuit board and the restoration element. In this way, when the touch device is pressed, the conductive pad is in contact with the conductive switch on the circuit board, so that the clicking function equivalent to a mouse button is triggered. The restoration element provides only a tactile force and a tactile feedback of pressing, and the noise generated during pressing may be reduced through the buffer layer. In short, the touch device is provided with a favorable tactile feedback without annoying clicking sounds. Besides, through the input module adopting the touch device, the user not only enjoys a favorable tactile feedback of pressing but also enjoys a favorable user experience thanks to the noise reduction effect provided by the input module.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Exemplary embodiments of the invention are described in detail, and examples of the exemplary embodiments are shown in the accompanying drawings. Whenever possible, the same element symbols are used in the drawings and descriptions to indicate the same or similar parts.

Figure 1A:
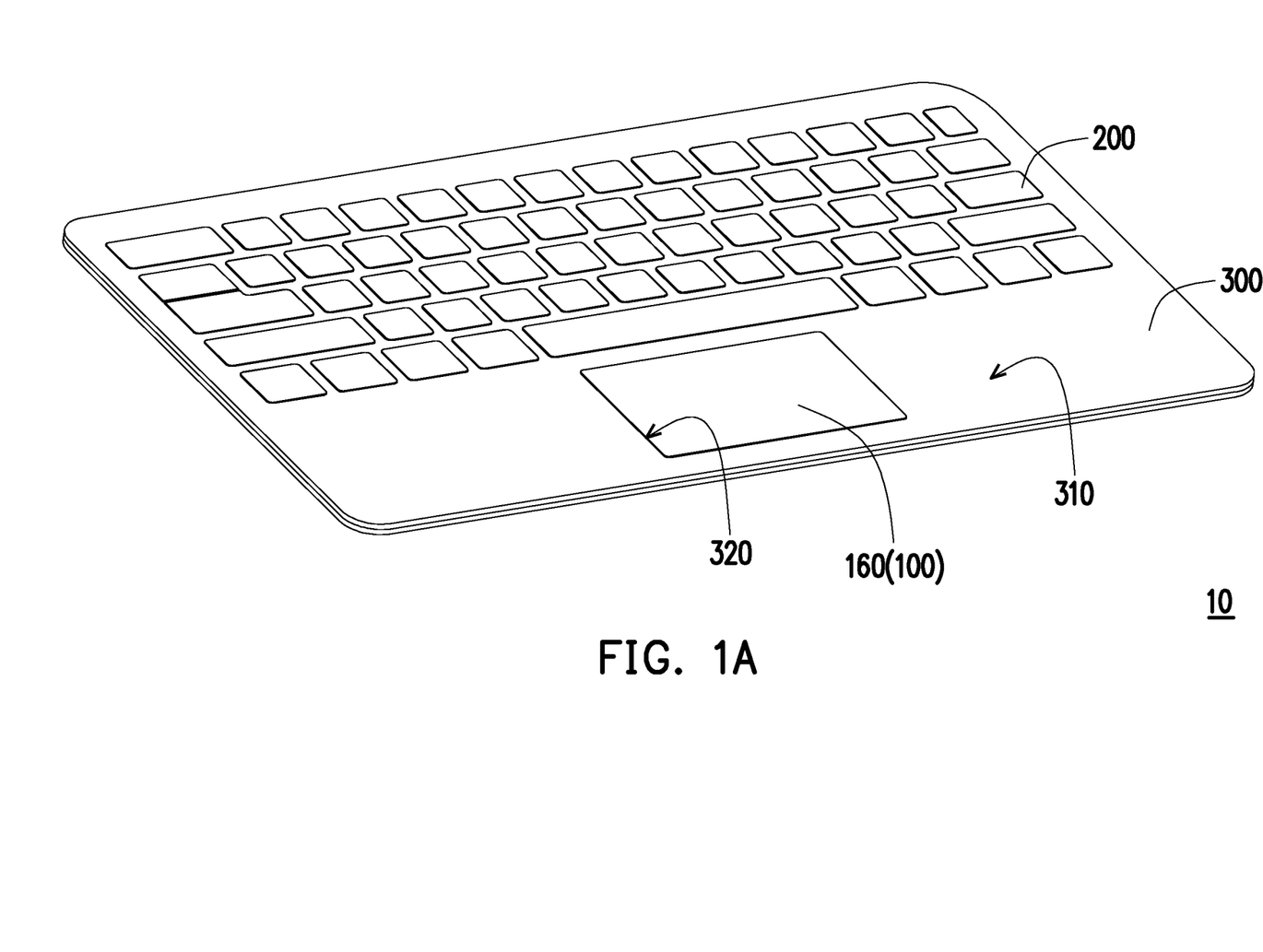
FIG. 1A is a schematic three-dimensional view of an input module according to an embodiment of the invention.
Figure 1B:
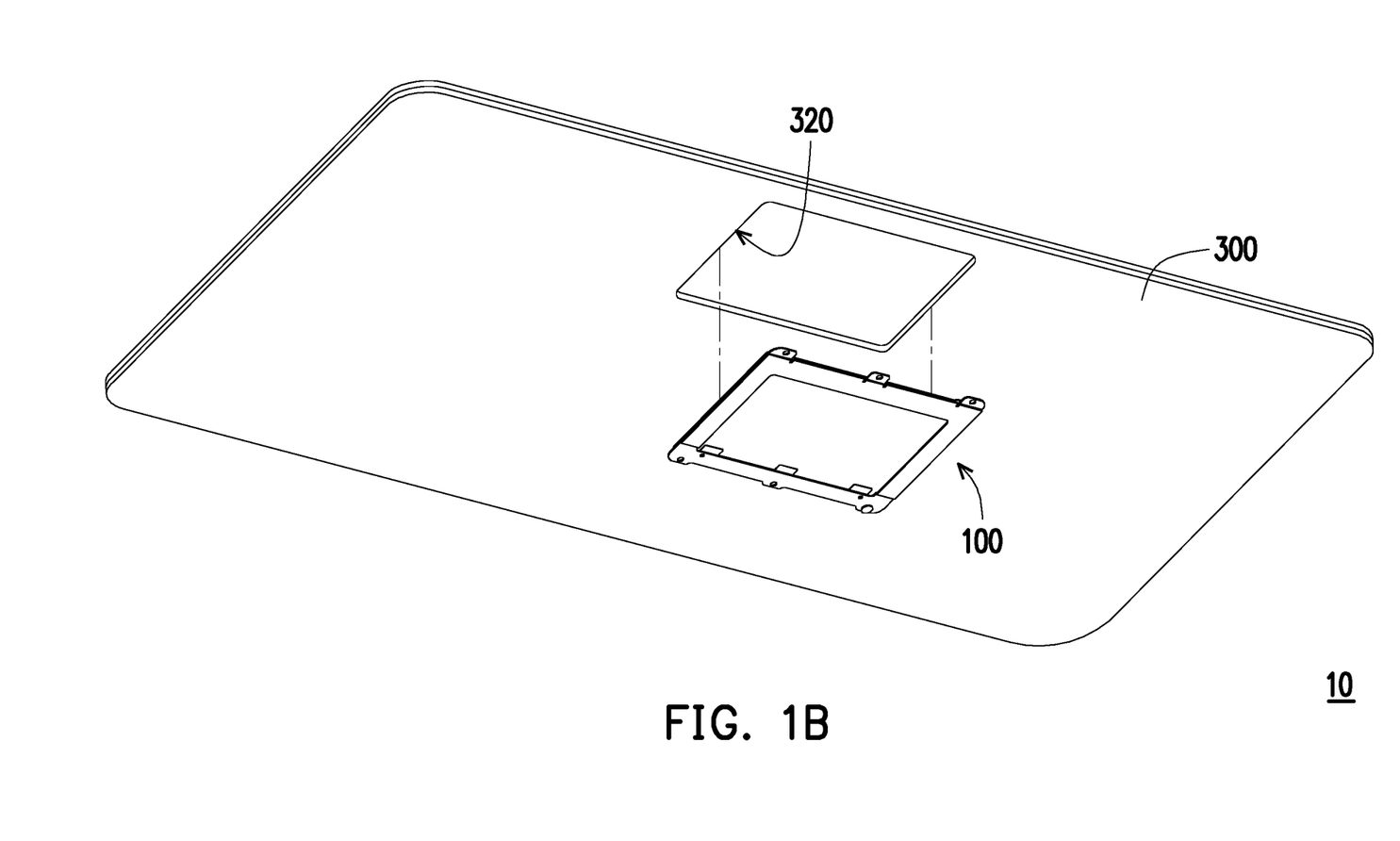
FIG. 1B is a schematic partial three-dimensional exploded view of the input module of FIG. 1A.
Figure 2A:
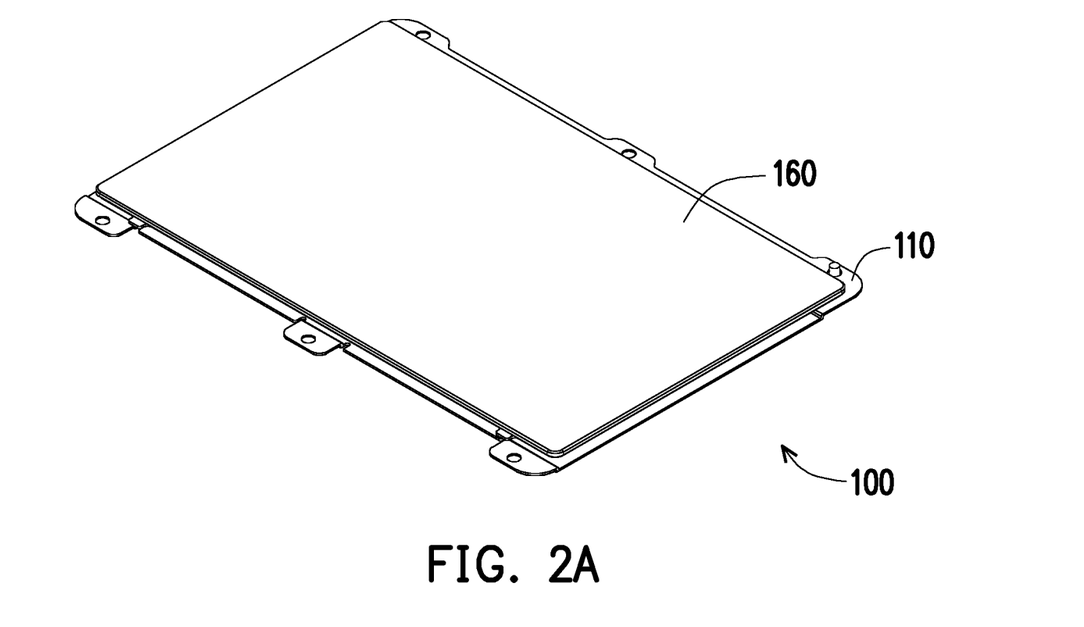
FIG. 2A is a schematic three-dimensional view of a touch device of the input module of FIG. 1A.
Figure 2B:
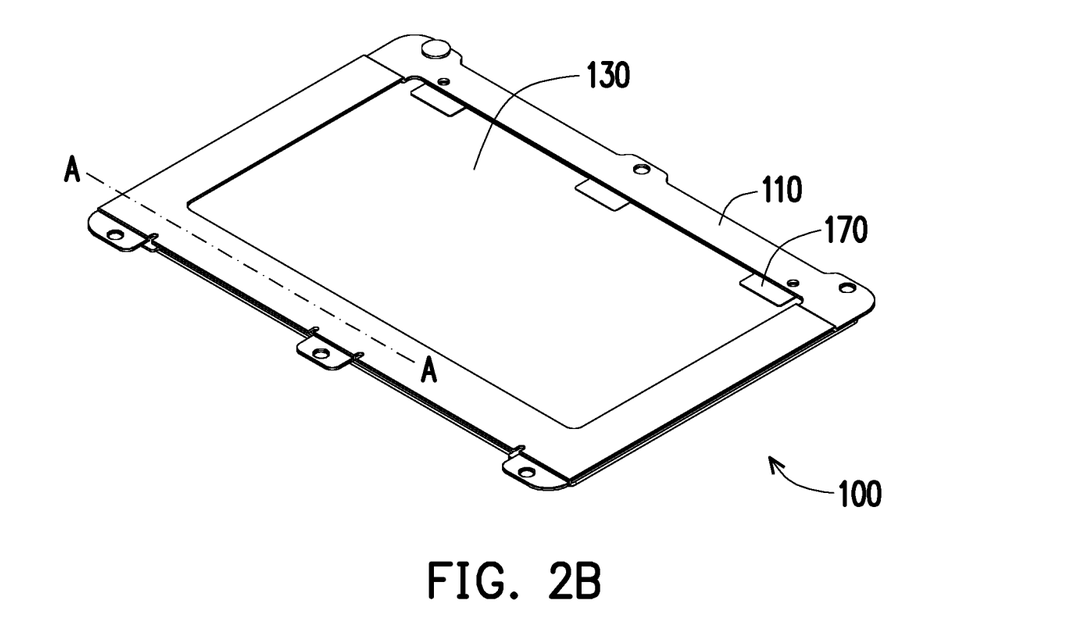
FIG. 2B is a schematic three-dimensional view of the touch device of FIG. 2A from another viewing angle.
Figure 2C:
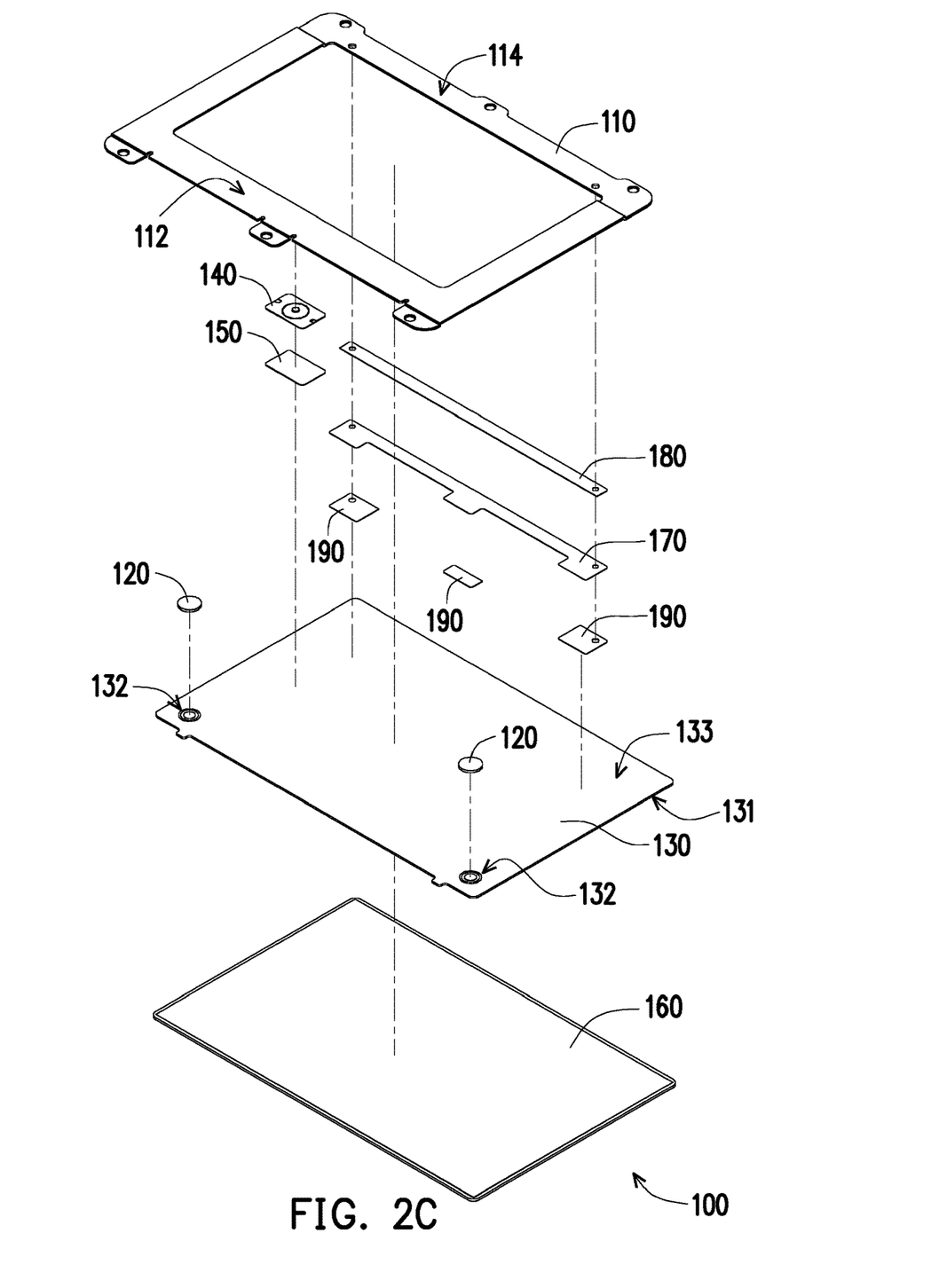
FIG. 2C is a schematic three-dimensional exploded view of the touch device of FIG. 2B.
Figure 2D:
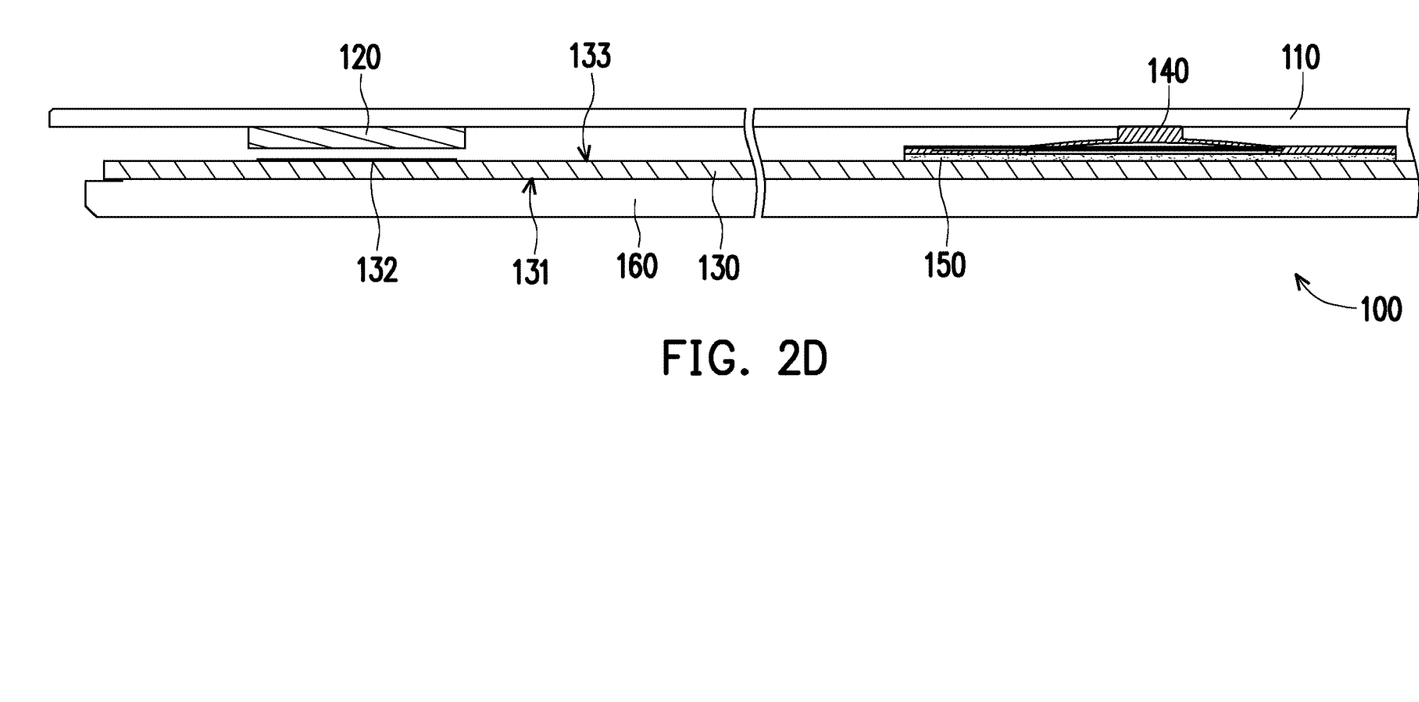
FIG. 2D is a schematic cross-sectional view of FIG. 2B taken along a line A-A.

FIG. 1A is a schematic three-dimensional view of an input module according to an embodiment of the invention. FIG. 1B is a schematic partial three-dimensional exploded view of the input module of FIG. 1A. FIG. 2A is a schematic three-dimensional view of a touch device of the input module of FIG. 1A. FIG. 2B is a schematic three-dimensional view of the touch device of FIG. 2A from another viewing angle. FIG. 2C is a schematic three-dimensional exploded view of the touch device of FIG. 2B. FIG. 2D is a schematic cross-sectional view of FIG. 2B taken along a line A-A. It should be noted that FIG. 2B presents a viewing angle of a touch device 100 of FIG. 2A being turned upside down by 180 degrees.

Referring to FIG. 1A and FIG. 1B first, an input module 10 of the present embodiment includes a casing 300, a keyboard assembly 200, and the touch device 100. The casing 300 has an operating surface 310 and an accommodating opening 320 penetrating the casing 300. The keyboard assembly 200 is disposed on the operating surface 310 of the casing 300, and the touch device 100 is disposed in the accommodating opening 320 of the casing 300. Herein, the input module 10 is, for example, a keyboard module suitable for being incorporated in a notebook computer (not shown), and the touch device 100 is, for example, a touchpad. In other embodiments that are not shown, the touch device 100 may also be disposed on a tablet computer and is not limited thereto.

Specifically, referring to FIG. 2A, FIG. 2B, FIG. 2C, and FIG. 2D together, the touch device 100 of the present embodiment includes a cover plate 160, a circuit board 130, a restoration element 140, a bracket 110, at least one conductive pad 120, and a buffer layer 150. As shown in FIG. 1A, the cover plate 160 is exposed on the operating surface 310 of the casing 300, that is, located on an outermost side of the touch device 100 for a user to touch and press. Herein, the cover plate 160 is, for example, a glass plate, but is not limited thereto.

The circuit board 130 is disposed on one side of the cover plate 160 and has a first surface 131 facing the cover plate 160, a second surface 133 opposite to the first surface 131, and at least one conductive switch (two conductive switches 132 are schematically shown) disposed on the second surface 133. The first surface 131 is, for example, a sensing surface, and the second surface 133 is, for example, a bottom surface. In an embodiment, the circuit board 130 may be a touch-sensing circuit board with a touch-sensing circuit (not shown) arranged on the first surface 131. A touch position or a movement track of the user may be confirmed by sensing changes in electric properties through the touch-sensing circuit, so that a touch-sensing and triggering operation may be performed. Herein, the cover plate 160 covers the first surface 131 of the circuit board 130, and the first surface 131 of the circuit board 130 is, for example, adhered to the cover plate 160 by adhesion through a double-sided tape or a hot-melt adhesive. Specifically, the conductive switch 132 is a circuit pattern formed on a surface of the circuit board 130 by electroplating, screen printing, or the like. The conductive switches 132 are, for example, disposed close to two corners and aligned with an edge of the second surface 133 of the circuit board 130, but is not limited thereto.

The bracket 110 is disposed on the second surface 133 of the circuit board 130. The bracket 110 has a first side 112 and a second side 114 opposite to each other. The conductive switch 132 may be disposed in a position on the circuit board 130 corresponding to the first side 112 of the bracket 110. A combination of the cover plate 160 and the circuit board 130 is connected (for example, pivotally connected around a rotation axis) to the second side 114 of the bracket 110, but is not limited thereto. Herein, the bracket 110 may be a metal frame having an opening, and a material thereof is, for example, stainless steel (SUS304), but is not limited thereto. In an embodiment, a thickness of the cover plate 160 may be greater than a thickness of the circuit board 130 or a thickness of the bracket 110, and in this way, a structure of the touch device 100 strengthened.

The restoration element 140 is disposed on the second surface 133 of the circuit board 130. The restoration element 140 is located between the circuit board 130 and the bracket 110. In an embodiment, an orthographic projection of the restoration element 140 onto the circuit board 130 does not overlap the conductive switch 132. That is, the conductive switches 132 are not disposed in the position of the circuit board 130 corresponding to the restoration element 140. Even if the touch device 100 is pressed, the restoration element 140 does not trigger the conductive switch 132 of the circuit board 130. The restoration element 140 is disposed corresponding to the first side 112 of the bracket 110 and may be located between the two conductive switches 132. The restoration element 140 and the two conductive switches 132 are, for example, arranged in a straight line on the second surface 133 of the circuit board 130, but are not limited thereto. Herein, the restoration element 140 is, for example but not limited thereto, a dome-shaped metal elastic sheet.

The conductive pad 120 is disposed on the bracket 110 and located between the bracket 110 and the circuit board 130. The conductive pad 120 and the restoration element 140 are separately disposed in positions corresponding to the first side 112 of the bracket 110. As shown in FIG. 2D, the conductive pad 120 corresponds to the conductive switch 132, and when the touch device 100 (or the cover plate 160) is not pressed, a proper gap is kept between the conductive pad 120 and the conductive switch 132. Herein, the conductive pad 120 is, for example, made of conductive foam, carbon granules, or an anisotropic conductive adhesive. An orthographic projection of the conductive pad 120 onto the circuit board 130 overlaps the corresponding conductive switch 132. In the present embodiment, an area of the orthographic projection of the conductive pad 120 onto the circuit board 130 is greater than or equal to a range of the circuit pattern of the corresponding conductive switch 132. In this way, when the touch device 100 is pressed such that the conductive pad 120 is in contact with the conductive switch 132, the conductive pad 120 may enable the circuit pattern of the conductive switch 132 to be turned on through electrical connection. A thickness of the conductive pad 120 is, for example, less than a thickness (or a height) of the restoration element 140. As the height of the restoration element 140 is greater, a gap may be provided between the conductive pad 120 and the conductive switch 132.

In particular, the buffer layer 150 is disposed between the second surface 133 of the circuit board 130 and the restoration element 140. Noise generated by the restoration element 140 when being pressed is thereby reduced. In an embodiment, one end of the restoration element 140 abuts against the buffer layer 150, and the other end of the restoration element 140 abuts against the bracket 110. The restoration element 140 may be electrically insulated from the conductive switch 132 through the buffer layer 150. When the touch device 100 is pressed down, the restoration element 140 provides only a tactile force and tactile feedback of pressing, but is not responsible for turning on the switch. Therefore, in addition to the mitigated noise generated by the depressed restoration element 140, the arrangement of the buffer layer 150 in the present embodiment may further prevent the switch from triggering by the restoration element 140. In another embodiment that is not shown, the orthographic projection of the restoration element 140 onto the circuit board 130 may overlap the conductive switch 132. That is, when the touch device 100 includes the buffer layer 150 to electrically isolate the restoration element 140 from the conductive switch 132, the circuit board 130 could be provided with the conductive switch 132 or not in a position corresponding to the restoration element 140.

The orthographic projection of the restoration element 140 onto the buffer layer 150 may completely fall within the range of the buffer layer 150. Preferably, an area of an orthographic projection of the buffer layer 150 onto the circuit board 130 is greater than or equal to an area of the orthographic projection of the restoration element 140 onto the circuit board 130. The buffer layer 150 is, for example, made of rubber, insulating foam, polyurethane (PU), polyethylene terephthalate (PET) (commonly known as Mylar), or other suitable insulating materials. The buffer layer 150 and the restoration element 140 together may have the combined thickness greater than the thickness of the conductive pad 120.

Furthermore, the touch device 100 of the present embodiment further includes a support 170. The support 170 is disposed between the bracket 110 and the second surface 133 of the circuit board 130. Herein, the support 170 and the restoration element 140 are respectively located on two opposite sides of the circuit board 130, but are not limited thereto. The touch device 100 further includes a first bonding layer 180. The first bonding layer 180 is disposed on one side of the support 170, and the support 170 is fixed onto the bracket 110 through the first bonding layer 180. In addition, the touch device 100 of the present embodiment may further include at least one second bonding layer (three second bonding layers 190 are schematically shown) disposed on the other side of the support 170. The support 170 is fixed onto the circuit board 130 through the second bonding layers 190. The support 170 could be bonded to the circuit board 130 and the bracket 110 by adhesion. Nevertheless, in other embodiments, the manner in which the support 170 is bonded to the circuit board 130 and the bracket 110 is not limited thereto. Herein, the support 170 is, for example, a metal elastic piece or a hinge. The support 170 is pivotally connected onto the second side 114 of the bracket 110 and is configured to enable the circuit board 130 and the cover plate 160 to swing up and down on the second side 114 of the bracket 110 acting as a fulcrum or a rotation axis when the touch device 100 is pressed down. The support 170 is disposed between the circuit board 130 and the bracket 110, so that the overall structure of the touch device 100 is strengthened. Moreover, the pressure applied to the combination of the cover plate 160 and the circuit board 130 may be distributed through the support 170, thereby enabling the respective edges of the touch device 100 to simultaneously move downward when being pressed, so that the conductive switch 132 on the circuit board 130 is certainly triggered. A sum of thicknesses of the support 170, the first bonding layer 180, and the second bonding layer 190 is, for example but not limited thereto, greater than the thickness of the conductive pad 120.

When the user uses the touch device 100 of the present embodiment, the user may control movement of a cursor through sliding over the cover plate 160 with his/her finger and presses the cover plate 160 to activate the clicking switch. That is, as the cover plate 160 could drive the circuit board 130 to press down against the restoration element 140 that is elastically compressed. As the circuit board 130 moves downward, the conductive switch 132 disposed on the second surface 133 abuts against the conductive pad 120 on the bracket 110, the conductive switch 132 is electrically connected through the conductive pad 120 and generates an operation signal, and a button function is thereby triggered. The function analogous to the controlling of a mouse click is thereby achieved. Herein, the conductive pad 120 is in contact with the conductive switch 132. That is, the conductive pad 120 is electrically connected to the conductive switch 132 and is connected to a microprocessor (not shown) on the circuit board 130 through a circuit on the circuit board 130, and in this way, signal processing may be performed. When the user no longer presses the cover plate 160, the cover plate 160 and the circuit board 130 return to the original positions owing to an elastic restoring force of the restoration element 140, so that the conductive pad 120 is separated from the conductive switch 132 on the circuit board 130.

In particular, the restoration element 140 of the present embodiment provides only a restoring force, a tactile force, and tactile feedback of pressing, and the noise generated during pressing may be reduced through the buffer layer 150. The two conductive switches 132 of the present embodiment are respectively located on two opposite sides of the restoration element 140. When the touch device 100 is pressed, since the two conductive pads 120 are in contact with the conductive switches 132 on the circuit board 130, the button-clicking function may be triggered, so that the touch device 100 may feature favorable sensitivity when being used. Therefore, in touch device 100 of the present embodiment, the noise generated during pressing is reduced, and the risk of which the switches cannot be turned on is also prevented. In addition, the input module 10 using the touch device 100 of the present embodiment provides favorable tactile feedback of pressing for the user and exhibits the noise reduction effect as well, so that the user may enjoy a favorable user experience.

It should be noted that in the above embodiments, the conductive pads 120 are correspondingly disposed at two corners of the bracket 110 by treating the restoration element 140 as a center, but the embodiments of the invention are not limited thereto. The distance between the restoration element 140 to one of the conductive pads 120 is, for example, equal to that between the restoration element 140 to the other of the conductive pads 120. As long as the restoration element is separately disposed from the conductive pads configured to turn on the switches and trigger the clicking functionality, it is within the scope to be protected by the invention.

In view of the foregoing, in the touch device of the embodiments of the invention, the buffer layer is disposed between the circuit board and the restoration element. Therefore, when the touch device is pressed, the conductive pad is in contact with the conductive switch on the circuit board, so that the button-clicking function may be triggered. Moreover, the restoration element provides only a tactile force and tactile feedback of pressing, and the noise generated during pressing the device may be reduced through the buffer layer. In short, the touch device of the invention could have the reduced clicking noise and favorable tactile feedback. Besides, through the input module using the touch device of the invention, the user may keep enjoying favorable tactile feedback of pressing and a good user experience thanks to the noise reduction effect.

Finally, it should be noted that the foregoing embodiments are merely used for describing the technical solutions of the invention, but are not intended to limit the invention. Although the invention is described in detail with reference to the foregoing embodiments, a person of ordinary skill in the art should understand that, modifications may still be made to the technical solutions in the foregoing embodiments, or equivalent replacements may be made to part or all of the technical features; and these modifications or replacements will not cause the essence of corresponding technical solutions to depart from the scope of the technical solutions in the embodiments of the invention.

What is claimed is:

1. A touch device, comprising:
    a cover plate;
    a circuit board, disposed on one side of the cover plate and comprising a first surface facing the cover plate, a second surface opposite to the first surface, and at least one conductive switch disposed on the second surface;
    a bracket, disposed on the second surface of the circuit board;
    a restoration element, disposed between the circuit board and the bracket;
    at least one conductive pad, corresponding to the at least one conductive switch and being disposed between the bracket and the circuit board, wherein the at least one conductive pad and the restoration element are separately disposed; and
    a buffer layer, covering a surface of the restoration element, wherein an area of an orthographic projection of the buffer layer onto the circuit board is greater than or equal to an area of an orthographic projection of the restoration element onto the circuit board.

2. The touch device according to claim 1, further comprising:
    a support, disposed between the bracket and the second surface of the circuit board,
    wherein the bracket comprises a first side and a second side opposite to each other, the at least one conductive switch and the restoration element are disposed corresponding to the first side of the bracket, and the support is pivotally connected to the second side of the bracket.

3. The touch device according to claim 2, further comprising:
    a first bonding layer, disposed on one side of the support, wherein the support is fixed onto the bracket through the first bonding layer; and
    a second bonding layer, disposed on the other side of the support, wherein the support is fixed onto the circuit board through the second bonding layer.

4. The touch device according to claim 1, wherein an orthographic projection of the restoration element onto the circuit board does not overlap the at least one conductive switch.

5. The touch device according to claim 1, wherein an orthographic projection of the restoration element onto the circuit board overlaps the at least one conductive switch, and the restoration element is electrically insulated from the at least one conductive switch through the buffer layer.

6. The touch device according to claim 1, wherein a material of the buffer layer comprises rubber, insulating foam, polyurethane, or polyethylene terephthalate, and a sum of thicknesses of the buffer layer and the restoration element is greater than a thickness of the at least one conductive pad.

7. The touch device according to claim 1, wherein the at least one conductive pad comprises conductive foam, carbon granules, or an anisotropic conductive adhesive, and the at least one conductive switch is a circuit pattern disposed on a surface of the circuit board, wherein a gap is provided between the at least one conductive pad and the corresponding at least one conductive switch when the touch device is not pressed.

8. The touch device according to claim 1, wherein an orthographic projection of the at least one conductive pad onto the circuit board overlaps the corresponding at least one conductive switch.

9. The touch device according to claim 1, wherein the circuit board comprises two conductive switches, and the restoration element is located between the two conductive switches.

10. An input module, comprising:
    a casing, comprising an operating surface and an accommodating opening penetrating the casing;
    a keyboard assembly, disposed on the operating surface of the casing; and
    a touch device, disposed in the accommodating opening of the casing, the touch device comprising:
        a cover plate, exposed on the operating surface;
        a circuit board, disposed on one side of the cover plate and comprising a first surface facing the cover plate, a second surface opposite to the first surface, and at least one conductive switch disposed on the second surface;

a bracket, disposed on the second surface of the circuit board, wherein the bracket comprises a first side and a second side opposite to each other, and the circuit board is connected to the second side of the bracket;

a restoration element, disposed on the second surface of the circuit board;

at least one conductive pad, located between the bracket and the circuit board, wherein the at least one conductive pad and the restoration element are separately disposed on the first side of the bracket, and the at least one conductive pad corresponds to the at least one conductive switch; and a buffer layer, disposed between the second surface of the circuit board and the restoration element.

11. The input module according to claim 10, further comprising:

a support, disposed between the circuit board and the bracket corresponding to the second side.

12. The input module according to claim 10, wherein the touch device comprises two conductive pads disposed corresponding to two corners of the bracket, and a distance between the restoration element to one of the conductive pads is equal to a distance between the restoration element to the other of the conductive pads.

13. The input module according to claim 10, wherein the at least one conductive switch is disposed outside a coverage of the restoration element.

14. The input module according to claim 10, wherein the conductive switch is disposed in a position corresponding to the restoration element, and the buffer layer is disposed between the restoration element and the conductive switch.

15. A touch device, disposed on one side of a keyboard assembly, the touch device comprising:

a cover plate;

a circuit board, comprising a first surface facing the cover plate, a second surface opposite to the first surface, and a conductive switch disposed on the second surface;

a bracket, disposed on the second surface of the circuit board, wherein the bracket comprises a first side and a second side opposite to each other, and the circuit board is connected to the second side of the bracket through a support, and the conductive switch is not disposed corresponding to the second side of the bracket;

a restoration element, disposed on the second surface of the circuit board; and a buffer layer, covering the restoration element, wherein an orthographic projection of the buffer layer onto the circuit board has a boundary range covering an orthographic projection of the restoration element onto the circuit board.

16. The touch device according to claim 15, wherein the restoration element is disposed on the first side of the bracket, and the first side of the bracket is distal to the keyboard assembly.

17. The touch device according to claim 15, wherein a distance between the restoration element and the keyboard assembly is greater than a distance between the support and the keyboard assembly.

\* \* \* \* \*